(12) United States Patent
Marseille

(10) Patent No.: US 8,783,533 B1
(45) Date of Patent: Jul. 22, 2014

(54) HAND COVERING WITH HOOK AND LOOP ATTACHMENT MEMBER FOR PORTABLE ELECTRONIC DEVICES

(71) Applicant: Ricardo Marseille, Boynton Beach, FL (US)

(72) Inventor: Ricardo Marseille, Boynton Beach, FL (US)

( * ) Notice: Subject to any disclaimer, the term of this patent is extended or adjusted under 35 U.S.C. 154(b) by 0 days.

(21) Appl. No.: 14/196,325

(22) Filed: Mar. 4, 2014

(51) Int. Cl.
*A44C 5/00* (2006.01)
*A45F 5/00* (2006.01)
*A45C 11/00* (2006.01)

(52) U.S. Cl.
CPC ............ *A45C 11/00* (2013.01); *A45F 2005/006* (2013.01); *A45F 2200/0516* (2013.01); *A45F 5/00* (2013.01); *Y10S 224/93* (2013.01)
USPC ............. 224/218; 224/219; 224/197; 224/930

(58) Field of Classification Search
CPC ........ A45C 5/00; A45F 5/00; A45F 2005/008
USPC ......... 224/222, 221, 219, 267, 197, 605, 901, 224/930
See application file for complete search history.

(56) References Cited

U.S. PATENT DOCUMENTS

| 4,654,895 | A | 4/1987 | Peters | |
|---|---|---|---|---|
| 6,360,928 | B1 * | 3/2002 | Russo | 224/218 |
| 6,726,070 | B2 * | 4/2004 | Lautner | 224/221 |
| 7,296,752 | B2 * | 11/2007 | Carnevali | 235/462.44 |
| 7,334,711 | B1 * | 2/2008 | Winters | 224/217 |
| 7,942,293 | B2 * | 5/2011 | Lawrence et al. | 224/218 |
| 8,140,131 | B1 * | 3/2012 | Green | 455/575.1 |
| 8,328,055 | B1 * | 12/2012 | Snyder | 224/197 |
| 8,616,423 | B2 * | 12/2013 | Wizikowski | 224/218 |
| 8,662,362 | B1 * | 3/2014 | Bastian et al. | 224/218 |
| 2004/0064870 | A1 | 4/2004 | Gold | |
| 2007/0083979 | A1 | 4/2007 | Daniels | |
| 2009/0321483 | A1 * | 12/2009 | Froloff | 224/267 |
| 2010/0155439 | A1 * | 6/2010 | Kantaneva | 224/250 |
| 2010/0327030 | A1 * | 12/2010 | Yang | 224/199 |
| 2012/0080462 | A1 * | 4/2012 | Hajarian | 224/219 |
| 2013/0300141 | A1 * | 11/2013 | Byrne | 294/25 |

\* cited by examiner

*Primary Examiner* — Justin Larson
*Assistant Examiner* — Lester L Vanterpool
(74) *Attorney, Agent, or Firm* — Crossley Patent Law; Micah C. Gunn

(57) ABSTRACT

A hand covering with hook and loop attachment member for a portable electronic device including a swivel ball mount, the swivel ball mount configured to engage a swivel ball of a base, a sheath configured to partially encompass and conform to a user's hand, the sheath in operational communication with the swivel ball mount, an elastomeric drawstring and elastomeric bands continuously disposed around various passageways of the sheath, a stopper frictionally and slidingly engaged with the drawstring, and a hook and loop attachment means disposed on each of the base and a portable electronic device, wherein the portable electronic device is attachable to and alternately detachable from the base of the hand covering. The present hand covering with hook and loop attachment member aids in holding portable electronic devices and prevents the dropping and breaking of said devices from tired fingers and sweaty hands.

6 Claims, 4 Drawing Sheets

HAND COVERING WITH HOOK AND LOOP ATTACHMENT MEMBER FOR PORTABLE ELECTRONIC DEVICES

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of hand coverings are known in the prior art. However, these hand coverings do not allow a user a means for removably attaching a portable electronic device to the hand covering. Because of this shortcoming, while using a portable electronic device, a user must grip the device with at least one of their hands. This can be tiresome and stressful on a user's fingers. Some users, such as those with arthritis may be prevented from using a portable electronic device for this reason alone. Further, it can be tricky to reorient the portable electronic device while a user is gripping it with one hand, because hands can become sweaty. Sweaty hands and tired fingers are a contributing factor of dropped and broken portable electronic devices.

Thus, what is needed a hand covering with hook and loop attachment member for a portable electronic device including a swivel ball mount, the swivel ball mount configured to engage a swivel ball of a base, a sheath configured to partially encompass and conform to a user's hand, the sheath in operational communication with the swivel ball mount, an elastomeric drawstring and elastomeric bands continuously disposed around various passageways of the sheath, a stopper frictionally and slidingly engaged with the drawstring, and a hook and loop attachment means disposed on each of the base and a portable electronic device, wherein the portable electronic device is attachable to and alternately detachable from the base of the hand covering. With the hand covering with hook and loop attachment member for portable electronic devices, user's are free from the worry of dropping and breaking their portable electronic devices due to tired fingers and sweaty hands.

FIELD OF THE INVENTION

The present invention relates to a hand covering with hook and loop attachment member, and more particularly, to a hand covering with hook and loop attachment member for portable electronic devices.

SUMMARY OF THE INVENTION

The general purpose of the present hand covering with hook and loop attachment member, described subsequently in greater detail, is to provide a hand covering with hook and loop attachment member for portable electronic devices which has many novel features that result in a hand covering with hook and loop attachment member which is not anticipated, rendered obvious, suggested, or even implied by prior art, either alone or in combination thereof.

The hand covering with hook and loop attachment member for portable electronic devices includes a swivel ball mount. The swivel ball mount has a proximal end and a distal end. The proximal end has a node, while the distal end has a flattened elongated surface. A plurality of channels traverse through the swivel ball mount. An aperture is centrally disposed on the elongated surface of the swivel ball mount and is configured to engage a swivel ball.

The hand covering with hook and loop attachment member further includes a base having a superior face and an inferior face, wherein the swivel ball is centrally disposed on the superior face. The swivel ball is engaged and in operational communication with the aperture of the swivel ball mount, wherein the base is configured to swivel about the swivel ball mount. In this embodiment a user is free to rotate the base around the swivel ball mount. Other means of rotating the base about the swivel ball mount are envisioned, such as ball bearing means for rotating the base about the swivel ball mount.

The hand covering with hook and loop attachment member further includes a sheath configured to partially encompass and conform to a user's hand. The sheath is in operational communication with the node and further includes a thumb covering. The thumb covering has a first outer perimeter and a first inner perimeter and is configured to partially encompass and conform to a user's thumb. The thumb covering is in operational communication with at least one of the channels of the swivel ball mount.

The sheath further includes a metacarpus covering having a second outer perimeter and a second inner perimeter, wherein the metacarpus covering is configured to partially encompass and conform to a user's metacarpus. The metacarpus covering is in operational communication with at least one of the channels of the swivel ball mount.

A plurality of passageways are disposed along the entire first outer perimeter, the entire first inner perimeter, the entire second outer perimeter, and the entire second inner perimeter. An elastomeric drawstring is continuously disposed within each of the passageways of the first outer perimeter, the second outer perimeter and each of the channels of the swivel ball mount. A stopper having a conduit configured to accept the drawstring therethrough frictionally and slidingly engages with the drawstring. A first elastomeric band is continuously disposed within the passageway of the first inner perimeter. A second elastomeric band is continuously disposed within the passageway of the second inner perimeter.

The hand covering with hook and loop attachment member further includes a hook and loop attachment member comprising a hook tape and a loop tape. Each of the hook tape and loop tape have an adhesive back. The adhesive back of the hook tape, and alternately the adhesive back of the loop tape, adheres to the inferior face of the base. The adhesive back of the loop tape, and alternately the adhesive back of the hook tape adheres to the outer surface of an electronic device. Wherein the electronic device is attachable to and alternately detachable from the base of the hand covering through hook and loop attachment means.

Thus has been broadly outlined the more important features of the present hand covering with hook and loop attachment member for a portable electronic device so that the detailed description thereof that follows may be better understood and in order that the present contribution to the art may be better appreciated.

Numerous objects, features and advantages of the present hand covering with hook and loop attachment member for a portable electronic device will be readily apparent to those of ordinary skill in the art upon reading the following detailed description of presently preferred, but nonetheless illustrative, examples of the present hand covering with hook and loop attachment member for a portable electronic device when taken in conjunction with the accompanying drawings.

BRIEF DESCRIPTION OF THE DRAWINGS

Figures

DETAILED DESCRIPTION OF THE DRAWINGS

Figure 1:
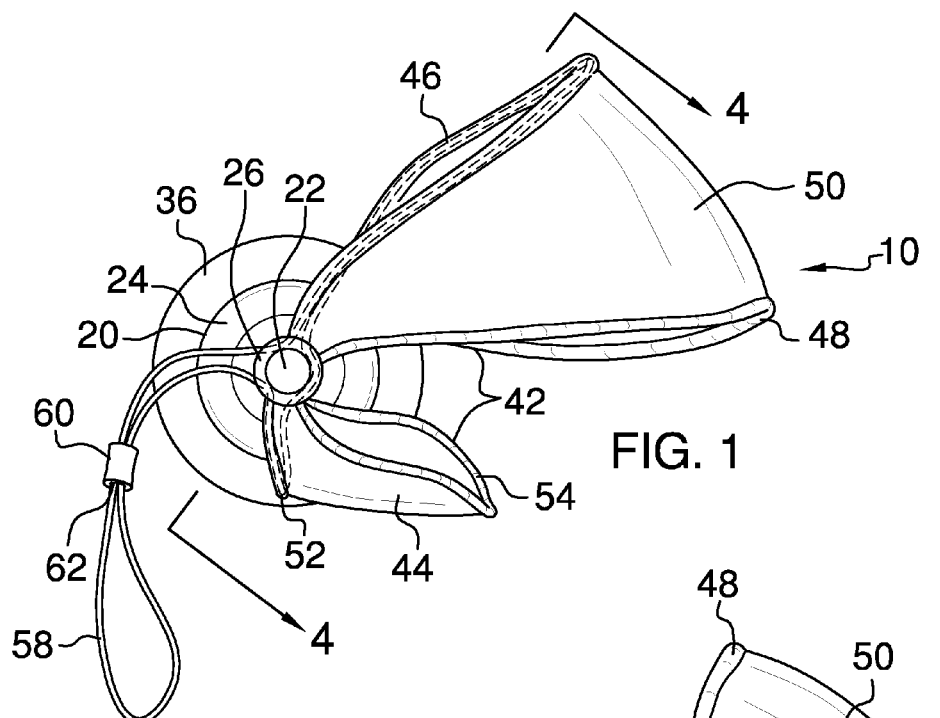
FIG. 1 is a front view.
Figure 2:
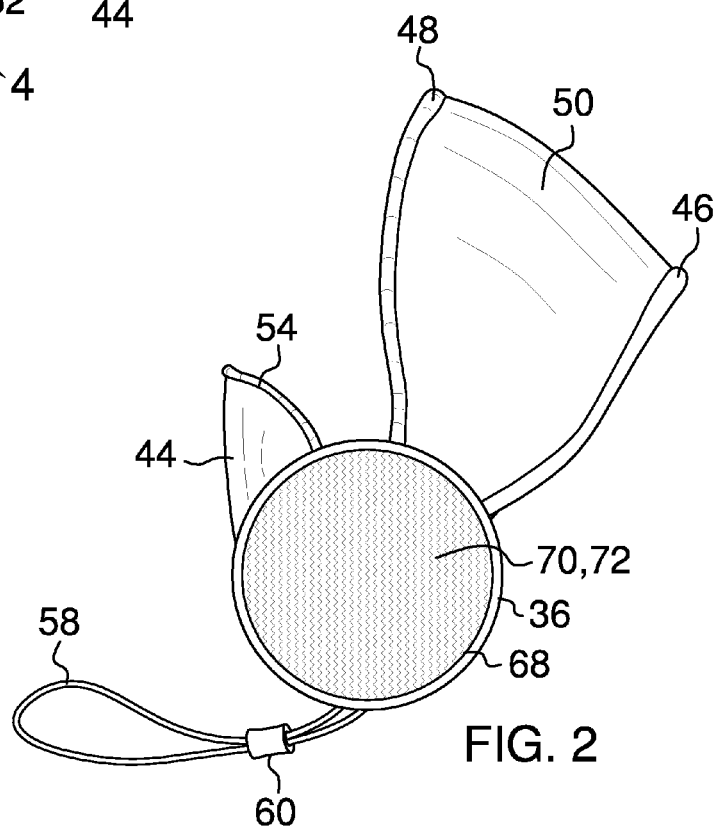
FIG. 2 is a rear view.
Figure 3:
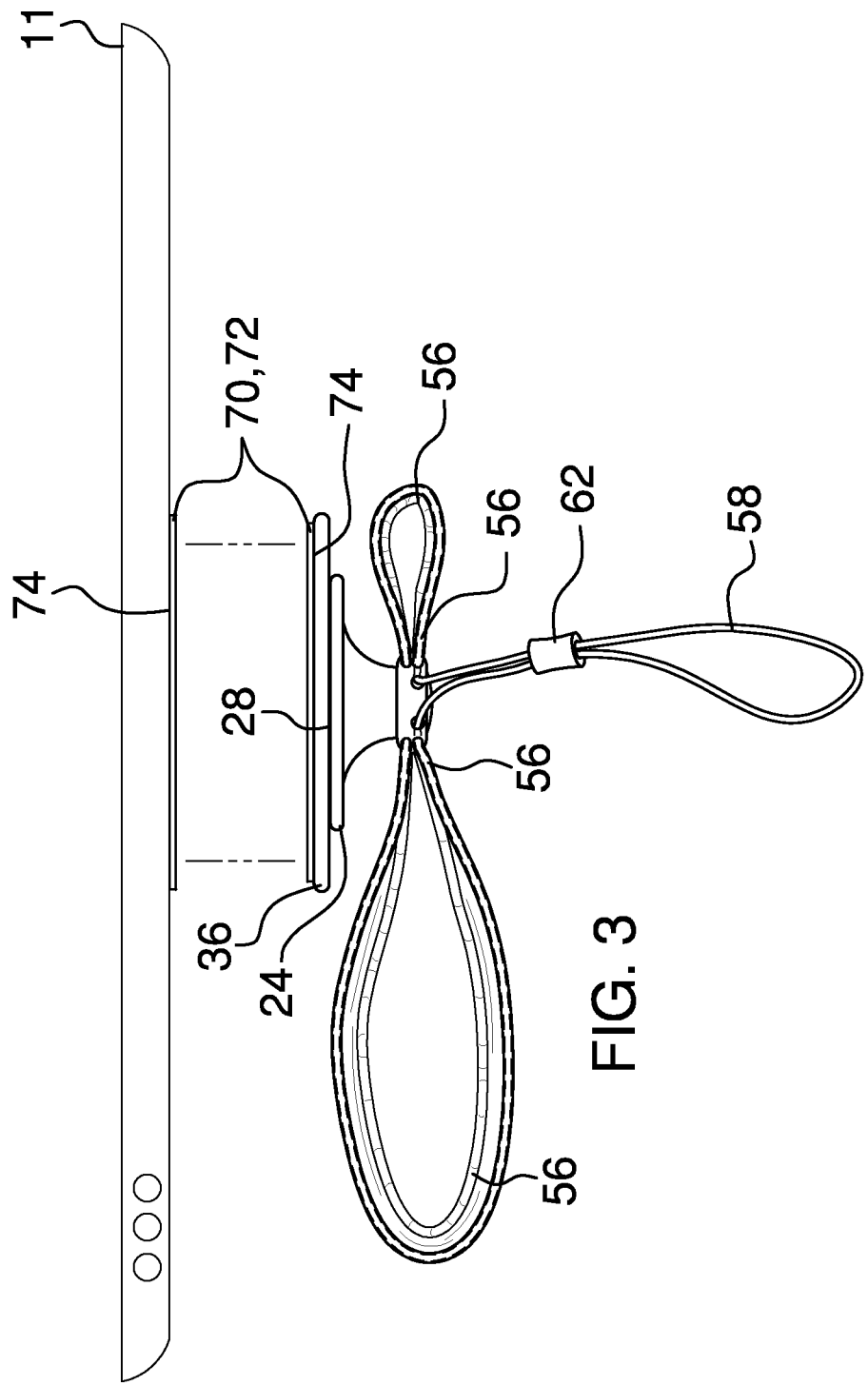
FIG. 3 is a top view of the device in use.
Figure 4:
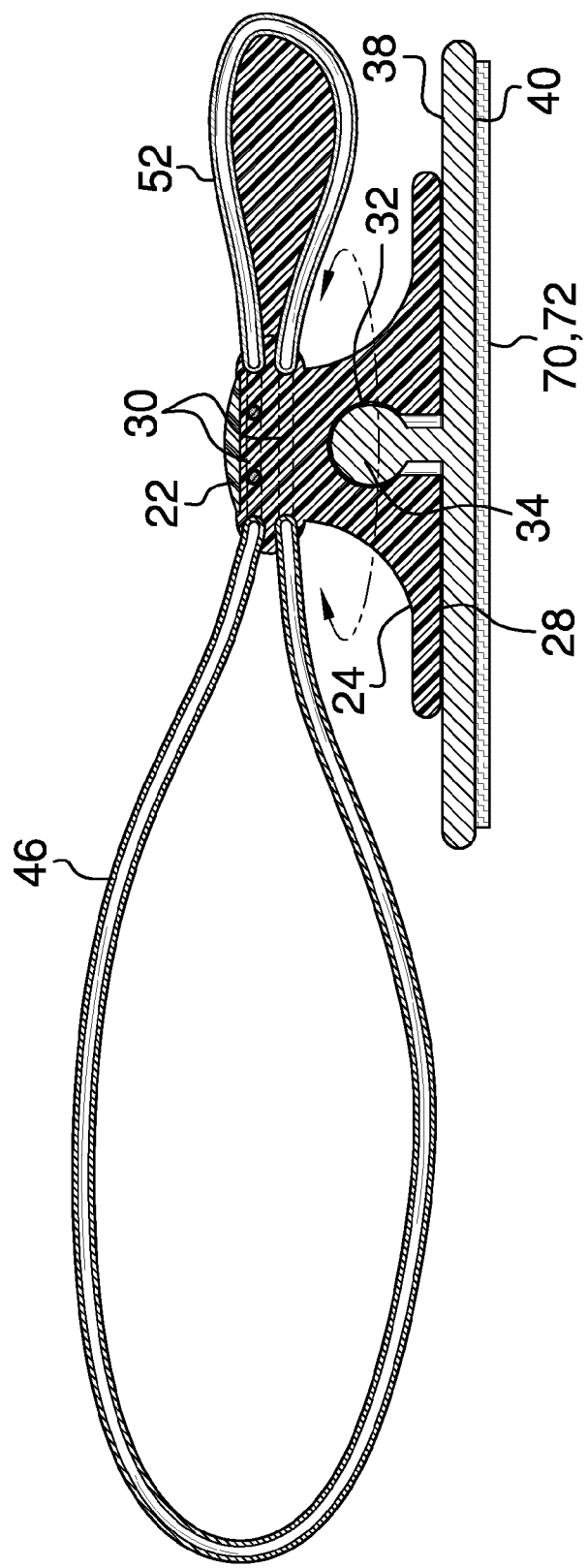
FIG. 4 is a cross-sectional view.
Figure 5:
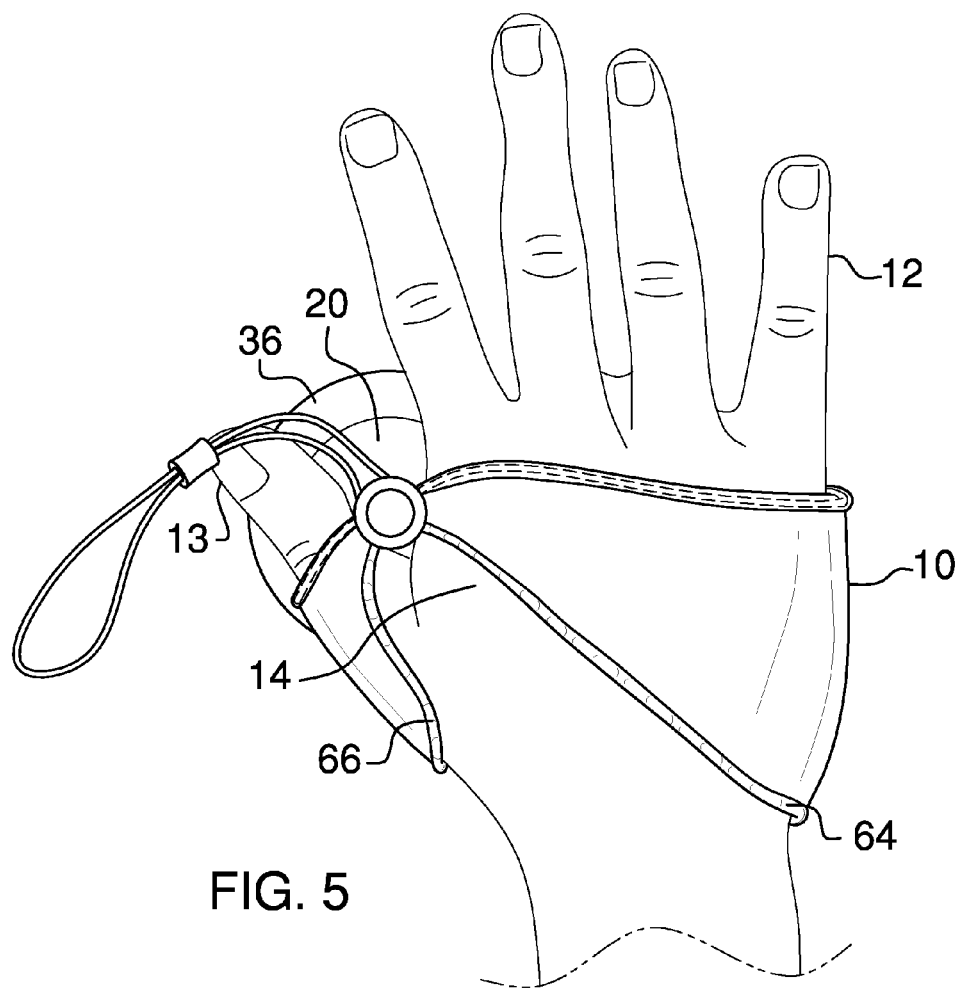
FIG. 5 is a front view of the device in use.

With reference now to the drawings, and in particular FIGS. 1 through 5 thereof, the instant hand covering with hook and loop attachment member for a portable electronic device employing the principles and concepts of the present hand covering with hook and loop attachment member and generally designated by the reference number 10 will be described.

Referring to FIGS. 1 through 5 a preferred embodiment of the hand covering with hook and loop attachment member for portable electronic devices 10 is illustrated. The hand covering with hook and loop attachment member 10 includes a swivel ball mount 20. The swivel ball mount 20 has a proximal end 22 and a distal end 24. The proximal end 22 has a node 26, while the distal end 24 has a flattened elongated surface 28. A plurality of channels 30 traverse through the swivel ball mount 20. An aperture 32 is centrally disposed on the elongated surface 28 of the swivel ball mount 20 and is configured to engage a swivel ball 34.

The hand covering with hook and loop attachment member 10 further includes a base 36 having a superior face 38 and an inferior face 40, wherein the swivel ball 34 is centrally disposed on the superior face 38. The swivel ball 34 is engaged and in operational communication with the aperture 32 of the swivel ball mount 20, wherein the base 36 is configured to swivel about the swivel ball mount 20. In this embodiment a user is free to rotate the base 36 about the swivel ball mount 20 allowing for reorientation of a portable electronic device 11 while the hand covering with hook and loop attachment member 10 is in use.

The hand covering with hook and loop attachment member 10 further includes a sheath 42 configured to partially encompass and conform to a user's hand 12. The sheath 42 is in operational communication with the node 26 and further includes a thumb covering 44. The thumb covering 44 has a first outer perimeter 46 and a first inner perimeter 48 and is configured to partially encompass and conform to a user's thumb 13. The thumb covering 44 is in operational communication with at least one of the channels 30 of the swivel ball mount 20.

The sheath 42 further includes a metacarpus covering 50 having a second outer perimeter 52 and a second inner perimeter 54, wherein the metacarpus covering 50 is configured to partially encompass and conform to a user's metacarpus 14. The metacarpus covering 50 is in operational communication with at least one of the channels 30 of the swivel ball mount 20.

A plurality of passageways 56 are disposed along the entire first outer perimeter 46, the entire first inner perimeter 48, the entire second outer perimeter 52, and the entire second inner perimeter 54. An elastomeric drawstring 58 is continuously disposed within each of the passageways 56 of the first outer perimeter 46, the second outer perimeter 52 and each of the channels 30 of the swivel ball mount 20. A stopper 60 having a conduit 62 configured to accept the drawstring 58 therethrough frictionally and slidingly engages with the drawstring 58. A first elastomeric band 64 is continuously disposed within the passageway 56 of the first inner perimeter 48. A second elastomeric band 66 is continuously disposed within the passageway of the second inner perimeter 54.

The hand covering with hook and loop attachment member 10 further includes a hook and loop attachment member 68 comprising a hook tape 70 a loop tape 72. Each of the hook tape 70 and the loop tape 72 have an adhesive back 74. The adhesive back 74 of the hook tape 70, and alternately the adhesive back 74 of the loop tape 72, adheres to the inferior face 40 of the base 36. The adhesive back 74 of the loop tape 72, and alternately the adhesive back 74 of the hook tape 70 adheres to the portable electronic device 11. Wherein the portable electronic device 11 is attachable to and alternately detachable from the base 36 through hook and loop attachment means.

What is claimed is:

1. A hand covering with hook and loop attachment member for a portable electronic device comprising:
    a swivel ball mount having a proximal end and a distal end, the proximal end having a node, the distal end having a flattened elongated surface;
    a sheath configured to partially encompass and conform to a user's hand, the sheath in operational communication with the node;
    an aperture centrally disposed on the elongated surface of the distal end of the swivel ball mount, the aperture configured to engage a swivel ball;
    a base having a superior face and an inferior face, the swivel ball centrally disposed on the superior face, wherein the swivel ball is engaged and in operational communication with the aperture of the swivel ball mount, wherein the base is configured to swivel about the swivel ball mount;
    a hook and loop attachment member comprising:
        a hook tape; and
        a loop tape;
        wherein each of the hook tape and the loop tape have an adhesive back; and
        wherein the adhesive back of the hook tape, and alternately the adhesive back of the loop tape, adheres to the inferior face of the base, and wherein the adhesive back of the loop tape, and alternately the adhesive back of the hook tape adheres to the outer surface of an electronic device, wherein the portable electronic device is attachable to and alternately detachable from the base.

2. The hand covering with hook and loop attachment member for a portable electronic device of claim 1:
    wherein the swivel ball mount further comprises a plurality of channels traversing therethrough;
    wherein the sheath further comprises:
        a thumb covering having a first outer perimeter, wherein the thumb covering is configured to partially encompass and conform to a user's thumb, wherein the thumb covering is in operational communication with at least one of the channels of the swivel ball mount;
        a metacarpus covering having a second outer perimeter, wherein the metacarpus covering is configured to partially encompass and conform to a user's metacarpus, wherein the metacarpus covering is in operational communication with at least one of the channels of the swivel ball mount;

a plurality of passageways disposed along the entire first outer perimeter and the entire second outer perimeter;

a drawstring continuously disposed within each of the passageways of the first outer perimeter, the second outer perimeter, and each of the channels of the swivel ball mount; and a stopper having a conduit configured to accept the drawstring therethrough, wherein the conduit frictionally slidingly engages with the drawstring.

3. The hand covering with hook and loop attachment member for a portable electronic device of claim 1:

wherein the swivel ball mount further comprises a plurality of channels traversing therethrough;

wherein the sheath further comprises:

a thumb covering having a first outer perimeter and a first inner perimeter, wherein the thumb covering is configured to partially encompass and conform to a user's thumb, wherein the thumb covering is in operational communication with at least one of the channels of the swivel ball mount;

a metacarpus covering having a second outer perimeter and a second inner perimeter, wherein the metacarpus covering is configured to partially encompass and conform to a user's metacarpus, wherein the metacarpus covering is in operational communication with at least one of the channels of the swivel ball mount;

a plurality of passageways disposed along the entire first outer perimeter, the entire first inner perimeter, the entire second outer perimeter, and the entire second inner perimeter;

a drawstring continuously disposed within each of the passageways of the first outer perimeter, the second outer perimeter, and each of the plurality of channels of the swivel ball mount;

a stopper having a conduit configured to accept the drawstring therethrough, wherein the conduit frictionally slidingly engages with the drawstring;

a first elastomeric band continuously disposed within the passageway of the first inner perimeter; and a second elastomeric band continuously disposed within the passageway of the second inner perimeter.

4. The hand covering with hook and loop attachment member for a portable electronic device of claim 2 wherein the drawstring is elastomeric.

5. The hand covering with hook and loop attachment member for a portable electronic device of claim 3 wherein the drawstring is elastomeric.

6. A hand covering with hook and loop attachment member for a portable electronic device comprising:

a swivel ball mount having a proximal end and a distal end, the proximal end having a node, the distal end having a flattened elongated surface;

a plurality of channels traversing through the swivel ball mount;

an aperture centrally disposed on the elongated surface of the distal end of the swivel ball mount, the aperture configured to engage a swivel ball;

a base having a superior face and an inferior face, the swivel ball centrally disposed on the superior face, wherein the swivel ball is engaged and in operational communication with the aperture of the swivel ball mount, wherein the base is configured to swivel about the swivel ball mount;

a sheath configured to partially encompass and conform to a user's hand, the sheath in operational communication with the node, wherein the sheath further comprises:

a thumb covering having a first outer perimeter and a first inner perimeter, wherein the thumb covering is configured to partially encompass and conform to a user's thumb, wherein the thumb covering is in operational communication with at least one of the channels of the swivel ball mount;

a metacarpus covering having a second outer perimeter and a second inner perimeter, wherein the metacarpus covering is configured to partially encompass and conform to a user's metacarpus, wherein the metacarpus covering is in operational communication with at least one of the channels of the swivel ball mount;

a plurality of passageways disposed along the entire first outer perimeter, the entire first inner perimeter, the entire second outer perimeter, and the entire second inner perimeter;

an elastomeric drawstring continuously disposed within each of the passageways of the first outer perimeter, the second outer perimeter, and each of the channels of the swivel ball mount;

a stopper having a conduit configured to accept the drawstring therethrough, wherein the stopper frictionally slidingly engages with the drawstring;

a first elastomeric band continuously disposed within the passageway of the first inner perimeter;

a second elastomeric band continuously disposed within the passageway of the second inner perimeter;

a hook and loop attachment member comprising:

a hook tape; and a loop tape;

wherein each of the hook tape and the loop tape have an adhesive back; and wherein the adhesive back of the hook tape, and alternately the adhesive back of the loop tape, adheres to the inferior face of the base, and wherein the adhesive back of the loop tape, and alternately the adhesive back of the hook tape adheres to the outer surface of an electronic device, wherein the portable electronic device is attachable to and alternately detachable from the base.

* * * * *